UNITED STATES PATENT OFFICE.

WILLIAM H. TRISSLER, OF CLEVELAND, OHIO.

IMPROVED COMPOSITION FOR POLISHING BRASS.

Specification forming part of Letters Patent No. 39,848, dated September 8, 1863.

*To all whom it may concern:*

Be it known that I, WILLIAM H. TRISSLER, of Cleveland, in the county of Cuyahoga and State of Ohio, have invented a new and useful Compound to be used in Polishing or Burnishing Brass and other Metallic Surfaces; and I do hereby declare the following to be a full and exact description thereof.

My improved brass-polish for polishing brass and other metals consists of a compound of burnt clay, such as is commonly used by brick-makers, tartaric acid, and common salt, which, when properly prepared and applied, will form an exceedingly useful substance or preparation for polishing or burnishing brass or other metals, producing a high polish and luster with comparatively little time or labor, and which will remain unaffected by exposure or other causes as long as, if not longer than, the polish and luster produced by any other means.

To enable others to make my improved brass-polish for polishing brass and other metals, I will proceed to describe its manufacture.

I take of burnt clay, such as is commonly used by brick-makers, and after pulverizing the same by any machinery or means which may be found most convenient and economical for the purpose, I mix thoroughly one thousand pounds of the same with ten pounds of tartaric acid, and ten pounds of common salt, the tartaric acid and salt having been dissolved in water together, and the two thus united, and while thus dissolved being thoroughly mixed with the pulverized burnt clay by hand or any convenient implements or machinery for effecting a perfect mixture or compound. The mixture or compound is then ready for use in scouring or burnishing brass or other metallic surfaces, moistening the same for use with water, or with oil if the tarnish is heavy, as the judgment of the operator may suggest, and applying the same to the surface to be burnished by means of cloths or other convenient methods of application, and rubbing and furbishing the surface in the usual way where substances are applied to and rubbed upon metallic surfaces to polish them.

This compound is believed to be unsurpassed in its promptness and efficiency as a furbishing agent, and in its freedom from corroding, scratching, or wearing the surfaces to which it may be applied or with which it may come in contact, which effects are so much deprecated in other furbishing agents in common use.

The proportions of the several component parts of my polish above described may be varied without materially affecting the utility, character, or novelty of the compound, and I do not therefore confine my invention or claim to the proportions of the above formula, though I have found it to be the best for general use.

What I claim as my invention, and desire to secure by Letters Patent, is—

The combination of burnt clay, tartaric acid, and common salt, substantially in the manner and for the purposes herein set forth.

The above specification of my improved brass-polish for polishing brass and other metals signed by me this 25th day of July, A. D. 1863.

W. H. TRISSLER.

Witnesses:
 GEO. WILLEY,
 G. H. BONHAM.